United States Patent [19]

Storck et al.

[11] Patent Number: 4,655,593
[45] Date of Patent: Apr. 7, 1987

[54] METHOD AND APPARATUS FOR ILLUMINATING A BRAGG CELL

[75] Inventors: Eckhard Storck; Michael Stockmann, both of Munich, Fed. Rep. of Germany

[73] Assignee: Siemens Aktiengesellschaft, Berlin and Munich, Fed. Rep. of Germany

[21] Appl. No.: 697,524

[22] Filed: Feb. 1, 1985

[30] Foreign Application Priority Data

Feb. 10, 1984 [DE] Fed. Rep. of Germany ....... 3404845

[51] Int. Cl.⁴ .............................................. G01J 3/00
[52] U.S. Cl. ................................... 356/300; 350/358
[58] Field of Search ............... 356/300; 324/77 K, 96; 350/358

[56] References Cited

U.S. PATENT DOCUMENTS

| 3,488,438 | 1/1970 | Korpel | 350/358 |
| 3,794,975 | 2/1974 | Korpel | 350/358 |
| 4,336,981 | 6/1982 | Mori | 350/358 |
| 4,390,875 | 6/1983 | McNaney | 350/358 |
| 4,500,175 | 2/1985 | Schaff et al. | 350/358 |

FOREIGN PATENT DOCUMENTS 545931 3/1977 U.S.S.R. ................................ 324/96

OTHER PUBLICATIONS

Korpel, Proc. Soc. Photo-Opt. Instrum. Eng., vol. 232, 1980 International Optical Computing Conference, p. 90.

Pearce et al., Optics Comm., V. 19, N. 1, Oct. 1976, p. 65.

Uchida, Opto-Electronics 2 Letters, V. 2, N. 1, Feb. 1970, p. 43.

Primary Examiner—F. L. Evans

[57] ABSTRACT

A method and apparatus for illuminating a Bragg cell employ a laser which is directed at the Bragg cell with the focus of the laser beam being disposed outside of the Bragg cell, such as immediately preceding the leading edge of the Bragg cell or the crystal containing the Bragg cell. A spectral analyzer with a Bragg cell disposed therein and operated in this manner has a significantly lower noise background thereby decreasing the lower dynamic limit of the analyzer.

2 Claims, 5 Drawing Figures

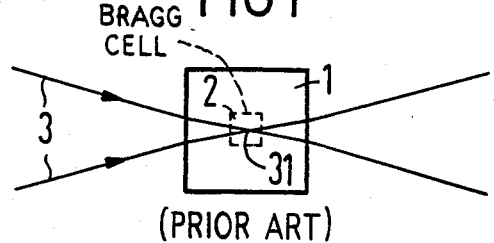
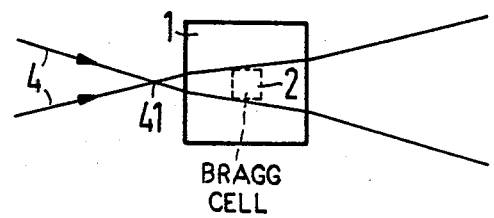
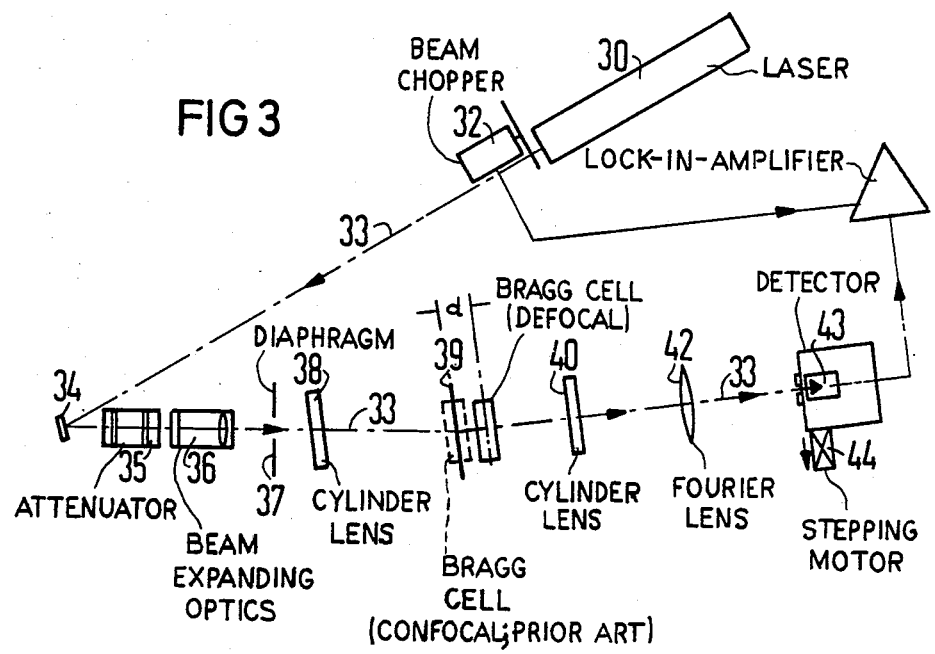

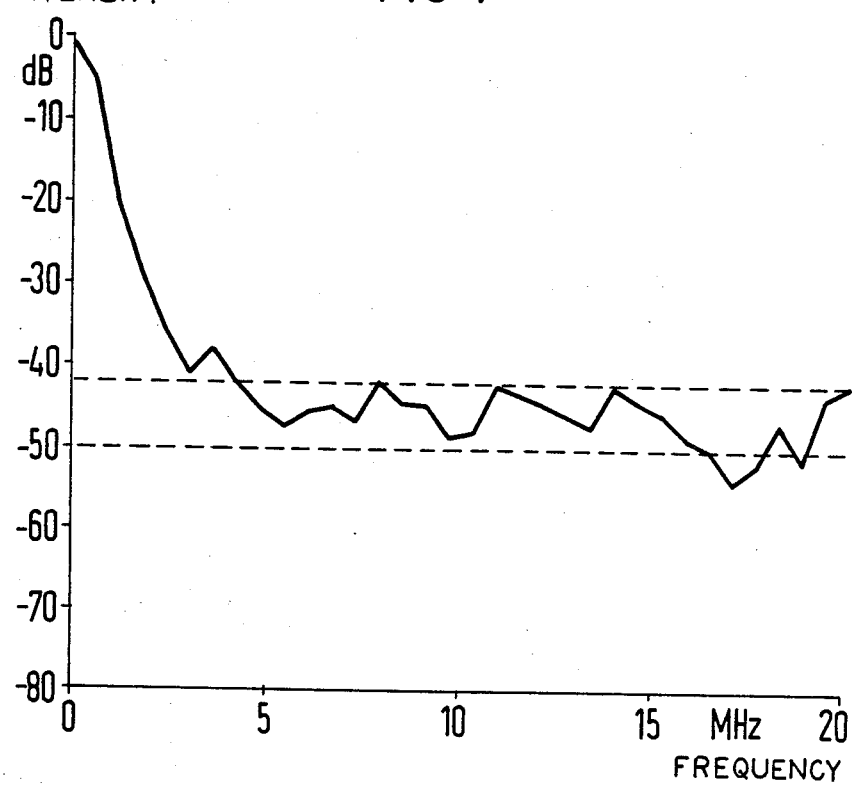

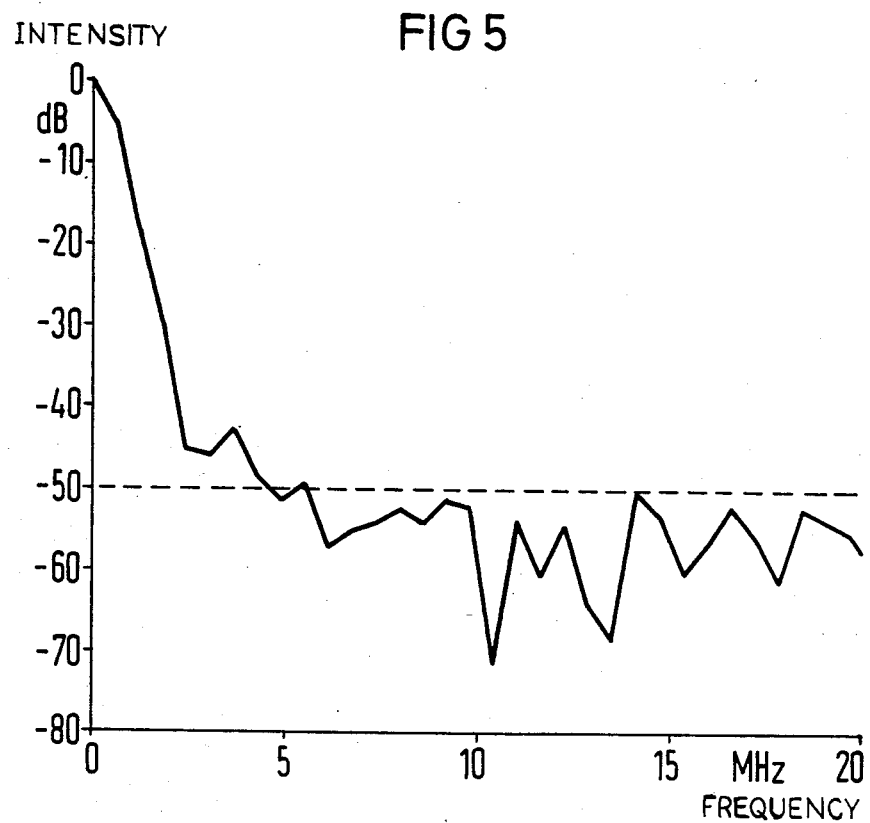

METHOD AND APPARATUS FOR ILLUMINATING A BRAGG CELL

BACKGROUND OF THE INVENTION

The present invention relates to methods for illuminating a Bragg cell and to a spectral analyzer employing a Bragg cell illuminated in accordance with the method disclosed herein.

The conventional manner of illuminating a Bragg cell with a cylindrically focused laser beam is to position the laser source and the Bragg cell such that the focus of the laser beam lies within the Bragg cell. This type of conventional Bragg cell illumination will be referred to herein as confocal illumination.

Conventional confocal illumination imposes limits on the dynamic operating range of the Bragg cell, and in particular imposes a lower dynamic limit on the cell.

It is an object of the present invention to provide a method for illuminating a Bragg cell which reduces the lower dynamic limit of the Bragg cell.

Another object of the present invention is to provide a spectral analyzer utilizing a Bragg cell illuminated in accordance with the method disclosed herein.

The above objects are inventively achieved in a Bragg cell which is illuminated by the steps of directing a cylindrically focused laser beam at the Bragg cell, and positioning the laser source and the Bragg cell such that the focus of the laser beam is disposed outside of the Bragg cell. A significantly reduced lower dynamic limit of the Bragg cell is thereby obtained.

A measuring set up for the dynamic range of a Bragg cell illuminated in this manner has a laser source, a beam chopper, an attenuator, beam expanding optics, a diaphragm, and a first cylinder lens all disposed in front of the Bragg cell in the direction of the beam propagation. The cylinder lens positions the focus of the laser beam slightly in front of the Bragg cell in accordance with the principles of the present invention. A detector on which the laser beam is incident is disposed after the Bragg cell, with a second cylinder lens and a Fourier lens disposed therebetween. The detector signal is lock-in-amplified. The detector is laterally positionable by a stepping motor.

The method disclosed herein of illuminating a Bragg cell with a laser beam such that the laser beam focus is outside of the Bragg cell shall be referred to herein as defocal illumination of the Bragg cell.

The method and apparatus disclosed herein proceed from consideration of light scatter which may occur during the illumination of a Bragg cell. The lower dynamic limit associated with the operation of a Bragg cell is given by the signal power NEP equivalent to the light scatter. This is a value which is proportional to light which is scattered into the signal band from the $0^{th}$ order. The NEP becomes greater as the expanse of the beam in the crystal containing the Bragg cell, or the surface thereof, becomes smaller. The Bragg cell must therefore be illuminated with a beam cross-section which is as large as possible. The upper limit is determined by the size of the acoustic field in the Bragg cell, generally having dimensions of approximately 15 mm×0.5 mm.

Such illumination could most simply be undertaken by means of a planar wave having a cross-section fitting the size of the acoustic field of the Bragg cell, the cross-section having the aforementioned area of approximately 15 mm×0.5 mm. For generating such a planar wave, however, suitable optical systems such as, for example, cylinder lenses must be illuminated as well with exactly this cross-section. Strong light scatter, which is superimposed on the light scatter of the $0^{th}$ order and prevents the desired reduction of the lower dynamic limit, is generated in such narrowly illuminated optical systems of cylinder lenses.

A focused laser beam however, may be produced without significant additional light scatter using a lens, that is illuminated with a large cross-section. The Bragg cell is therefore in accordance with the principles of the present invention illuminated with a focused beam with the focus of the laser beam being disposed outside of the Bragg cell, rather than in the Bragg cell as in conventional devices.

DESCRIPTION OF THE DRAWINGS

FIG. 1 is a schematic illustration of a conventional confocal method of illuminating a Bragg cell.

FIG. 2 is a schematic illustration of a defocal method of illumination of a Bragg cell in accordance with the principles of the present invention.

FIG. 3 is a schematic diagram of a measuring setup for the dynamic range of a Bragg cell illuminated in accordance with the principles of the present invention.

FIG. 4 is a graph showing the distribution of intensity in the detector plane of the measuring setup shown in FIG. 3 given conventional confocal illumination of the Bragg cell.

FIG. 5 is a graph showing the distribution of intensity in the detector plane of the measuring setup of FIG. 3 given defocal illumination of the Bragg cell in accordance with the principles of the present invention.

DESCRIPTION OF THE PREFERRED EMBODIMENTS

A conventional means for illuminating a Bragg cell is schematically shown in FIG. 1. The Bragg cell 2 is shown in dashed lines and is implemented in a crystal 1, such as a LiNbO$_3$ crystal. In such conventional confocal illumination, the focus 31 of a laser beam 3 lies inside the Bragg cell 2.

A method for illuminating a Bragg cell in accordance with the principles of the present invention is shown in FIG. 2, wherein again the Bragg cell 2 is implemented in a crystal 1. In accordance with this method, the focus 41 of a laser beam 4 lies outside of the Bragg cell 2, particularly at such a distance in front of a leading edge of the Bragg cell such that the laser beam 4 illuminates the apperature of the Bragg cell 2 as fully as possible.

The spectra of conventional confocal and the inventive defocal illumination of a Bragg cell were measured in a setup as shown in FIG. 3 with a single detector. Graphs showing the differing light scatter and the improvement achieved with the inventive method are shown in FIGS. 4 and 5, described in greater detail below. The graphs shown in FIGS. 4 and 5 were obtained with the apparatus shown in FIG. 3.

The measuring setup shown in FIG. 3 includes a laser 30 which emits a laser beam 33 in the direction of a deflection mirror 34. The laser beam 33 is periodically interrupted or chopped by a beam chopper 32 disposed between the laser 30 and the mirror 34. The reflected laser beam 33 passes through an attenuator 35 and is expanded to a larger diameter by beam expanding optics 36. The expanded laser beam 33 then transradiates a limiting diaphragm 37, and is then focused by a cylinder lens 38 onto a focal line 39. A Bragg cell is disposed in the beam path of the focused laser beam. For measuring the effect of conventional confocal illumination, the Bragg cell is disposed such that the focal line 39 lies in the center of the Bragg cell. For measuring light scatter with defocal illumination of the Bragg cell, the Bragg cell is disposed a distance d behind the focal line 39 in the direction of beam propagation. The Bragg cell bounded by broken lines indicates the case of confocal illumination, and the Bragg cell bounded with solid lines indicates the case of defocal illumination.

The light emerging from the Bragg cell first passes through a cylinder lens 40 and is then focused by a Fourier lens 42 onto a single detector 43. The detective signal is lock-in-amplified. The detector 43 is displacable in directions perpendicular to the optical axis by means of a stepping motor 44.

A Bragg cell 3500S of CTI Company was employed in the setup shown in FIG. 3 for the purpose of generating the measurements shown in FIGS. 4 and 5. For defocal illumination of the Bragg cell, the distance d from the focal line 39 to the center of the Bragg cell was 24 mm. A RF-power of +17 dBm was used for both confocal and defocal illumination.

The measured distribution of signal light and light scatter given confocal illumination of the Bragg cell in the setup shown in FIG. 3 is represented in FIG. 4, with the vertical axis representing intensity and the horizontal axis representing frequency. As can be seen from FIG. 4, the noise background for such conventional illumination is at approximately −43 dB, below the peak power of +17 dBm, corresponding to a signal power NEP of 17 dBm−43 dB=−26 dBm.

The distribution of signal light and light scatter given defocal illumination of the Bragg cell in the setup of FIG. 3 is shown in FIG. 5. Again intensity is represented on the vertical axis, and frequency on the horizontal axis. In contrast to the distribution shown in FIG. 4, the noise background given defocal illumination now is at about −50 dB below peak power, meaning that the lower dynamic limit could be reduced by means of defocal illumination by approximately 7 dB to −33 dBm. The signal power NEP equivalent to light scatter is by means of this method now at −33 dBm.

In further comparative experiment, the signal detector 43 with the lock-in-amplifier and the chopper in the setup shown in FIG. 3 was replaced by a detector array (Reticon CCPD 128×8, 1 ms integration time). The lower dynamic limit of the Bragg cell was directly measured with this array. Again the measurements showed that given confocal illumination of the Bragg cell, the signal at −26 dBm just reaches the peaks of the noise background. Given defocal illumination, the signal already reached the peaks of the noise background at −33 dBm.

Although modifications and changes may be suggested by those skilled in the art it is the intention of the inventors to embody within the patent warranted hereon all changes and modifications as reasonably and properly come within the scope of their contribution to the art.

We claim as our invention:

1. A spectral analyzer comprising:
   a light source emitting a light beam;
   a means for focusing said light beam at a focus;
   a Bragg cell illuminated by the focus light beam, said Bragg cell having a leading edge in the direction of propagation of said light beam and positioned such that said focus is disposed in front of said leading edge of said Bragg cell; and
   a detector on which light emerging from said Bragg cell is incident.

2. A spectral analyzer as claimed in claim 1 wherein said light source is a laser.

* * * * *